(12) United States Patent
Cho et al.

(10) Patent No.: US 8,390,769 B2
(45) Date of Patent: Mar. 5, 2013

(54) LIQUID CRYSTAL DISPLAY

(75) Inventors: Young-Je Cho, Cheonan-si (KR);
Yoon-Jang Kim, Suwon-si (KR);
Yun-Jung Cho, Asan-si (KR);
Kweon-Sam Hong, Seoul (KR);
Yong-Jo Kim, Seoul (KR); Kee-Bum Park, Cheonan-si (KR); Seon-Kyoon Mok, Hwaseong-si (KR); Woo-Jung Shin, Incheon-si (KR); Dong-Ho Shin, Seongnam-si (KR); Kook-Hyun Choi, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 322 days.

(21) Appl. No.: 12/842,163

(22) Filed: Jul. 23, 2010

(65) Prior Publication Data
US 2011/0075078 A1 Mar. 31, 2011

(30) Foreign Application Priority Data

Sep. 25, 2009 (KR) ........................ 10-2009-0091161

(51) Int. Cl.
*G02F 1/1335* (2006.01)
(52) U.S. Cl. ....................................................... 349/108
(58) Field of Classification Search .................. 349/108
See application file for complete search history.

(56) References Cited

U.S. PATENT DOCUMENTS

| 5,037,185 | A | * | 8/1991 | Grupp | ........................... | 349/195 |
| 7,456,922 | B2 | | 11/2008 | Eguchi | | |
| 2007/0058099 | A1 | * | 3/2007 | Eguchi | ............................ | 349/43 |
| 2007/0059491 | A1 | * | 3/2007 | Kawashima et al. | ......... | 428/141 |
| 2009/0303424 | A1 | * | 12/2009 | Lee et al. | ...................... | 349/122 |
| 2010/0109007 | A1 | * | 5/2010 | Lee et al. | ......................... | 257/59 |
| 2010/0127272 | A1 | * | 5/2010 | Jeong et al. | ..................... | 257/72 |

FOREIGN PATENT DOCUMENTS

| JP | 11-354806 | 12/1999 |
| JP | 2001-318622 | 11/2001 |
| JP | 2003-029297 | 1/2003 |
| JP | 2005-128226 | 5/2005 |
| JP | 2005-175381 | 6/2005 |
| JP | 2005-227519 | 8/2005 |
| KR | 1020060131256 | 12/2006 |
| KR | 1020080006133 | 1/2008 |
| KR | 1020090049131 | 5/2009 |
| KR | 1020090061448 | 6/2009 |

* cited by examiner

*Primary Examiner* — Timothy L Rude
(74) *Attorney, Agent, or Firm* — F. Chau & Associates, LLC

(57) ABSTRACT

A liquid crystal display according to an exemplary embodiment of the present invention includes a substrate, a gate line formed on the substrate, a data line intersecting the gate line and including a source electrode, a drain electrode facing the source electrode, a passivation layer formed on the data line and the drain electrode, a color filter formed on the passivation layer, a cover formed on the color filter and having a contact hole exposing the drain electrode, and a pixel electrode formed on the cover and connected to the drain electrode through the contact hole, wherein the cover includes a dummy hole exposing the color filter.

18 Claims, 12 Drawing Sheets

LIQUID CRYSTAL DISPLAY

CROSS-REFERENCE TO RELATED APPLICATION

This application claims priority to and the benefit of Korean Patent Application No. 10-2009-0091161 filed in the Korean Intellectual Property Office on Sep. 25, 2009, the entire contents of which are incorporated herein by reference.

BACKGROUND OF THE INVENTION (a) Technical Field

The present invention relates to a liquid crystal display.

(b) Discussion of the Related Art

A liquid crystal display (LCD) is one of the most commonly used flat panel displays, and it includes two substrates with electrodes formed thereon and a liquid crystal layer interposed between the two substrates. In the LCD, a voltage is applied to the electrodes to align liquid crystal molecules of the liquid crystal layer to thereby regulate the transmittance of light passing through the liquid crystal layer.

The liquid crystal display includes a color filter to realize images of various colors, and uses a thin film transistor as a switching element for independently driving each pixel. The thin film transistor is connected to a gate line transmitting a scanning signal, a data line transmitting an image signal, and a pixel electrode. The scanning signal and the data signal are transmitted through the gate line and the data line, respectively, and the thin film transistor controls the data signal transmitted to the pixel electrode according to the scanning signal.

The gate line and the data line are made of a conductive material such as a metal, the pixel electrode is made of a transparent conductive material such as indium tin oxide (ITO) or indium zinc oxide (IZO), and the pixel electrode and the thin film transistor are connected to each other through a contact hole.

When the color filter and the thin film transistor are formed on the same display panel, the color filter may be damaged in the process of forming the contact hole to connect the pixel electrode and the thin film transistor.

SUMMARY OF THE INVENTION

The embodiments of the present invention simultaneously prevent a change of a color coordinate due to damage to the color filter and a filling failure of liquid crystal.

A liquid crystal display according to an exemplary embodiment of the present invention includes a substrate, a gate line formed on the substrate, a data line intersecting the gate line and including a source electrode, a drain electrode facing the source electrode, a passivation layer formed on the data line and the drain electrode, a color filter formed on the passivation layer, a cover formed on the color filter and having a contact hole exposing the drain electrode, and a pixel electrode formed on the cover and connected to the drain electrode through the contact hole, wherein the cover includes a dummy hole exposing the color filter.

The color filter may include red, green, and blue color filters, and the dummy hole or a plurality of dummy holes may expose the red, green, and blue color filters.

The area of the dummy hole may be in the range of about 10 $\mu m^2$-about 500 $\mu m^2$.

The dummy hole may be covered by the pixel electrode.

The passivation layer and the color filter may further include an opening exposing the drain electrode, and the contact hole may be formed in the opening.

The color filter may include red, green, and blue color filters, and the dummy hole or a plurality of dummy holes may expose a maximum of two color filters of the red, green, and blue color filters.

The area of the dummy hole may be in the range of about 10 $\mu m^2$-about 200 $\mu m^2$.

The color filter may include red, green, and blue color filters, and the dummy hole may expose a maximum of one color filter of the red, green, and blue color filters.

The cover may be made of silicon nitride.

A liquid crystal display according to an exemplary embodiment of the present invention includes a substrate, a gate line formed on the substrate, a data line intersecting the gate line, a passivation layer formed on the data line, a color filter formed on the passivation layer, a cover formed on the color filter, and a pixel electrode formed on the cover, wherein the cover includes a dummy hole formed over a portion of the gate line and exposing the color filter.

According to an exemplary embodiment of the present invention, the dummy hole exposing the color filter is formed, the dummy hole is covered by the pixel electrode, or the total area of the dummy hole is controlled such that slight changes due to damage to the color filter may be prevented, and the liquid crystal not being sufficiently filled due to discharge of the color filter material may be prevented.

DETAILED DESCRIPTION OF THE EMBODIMENTS

Figure 1:
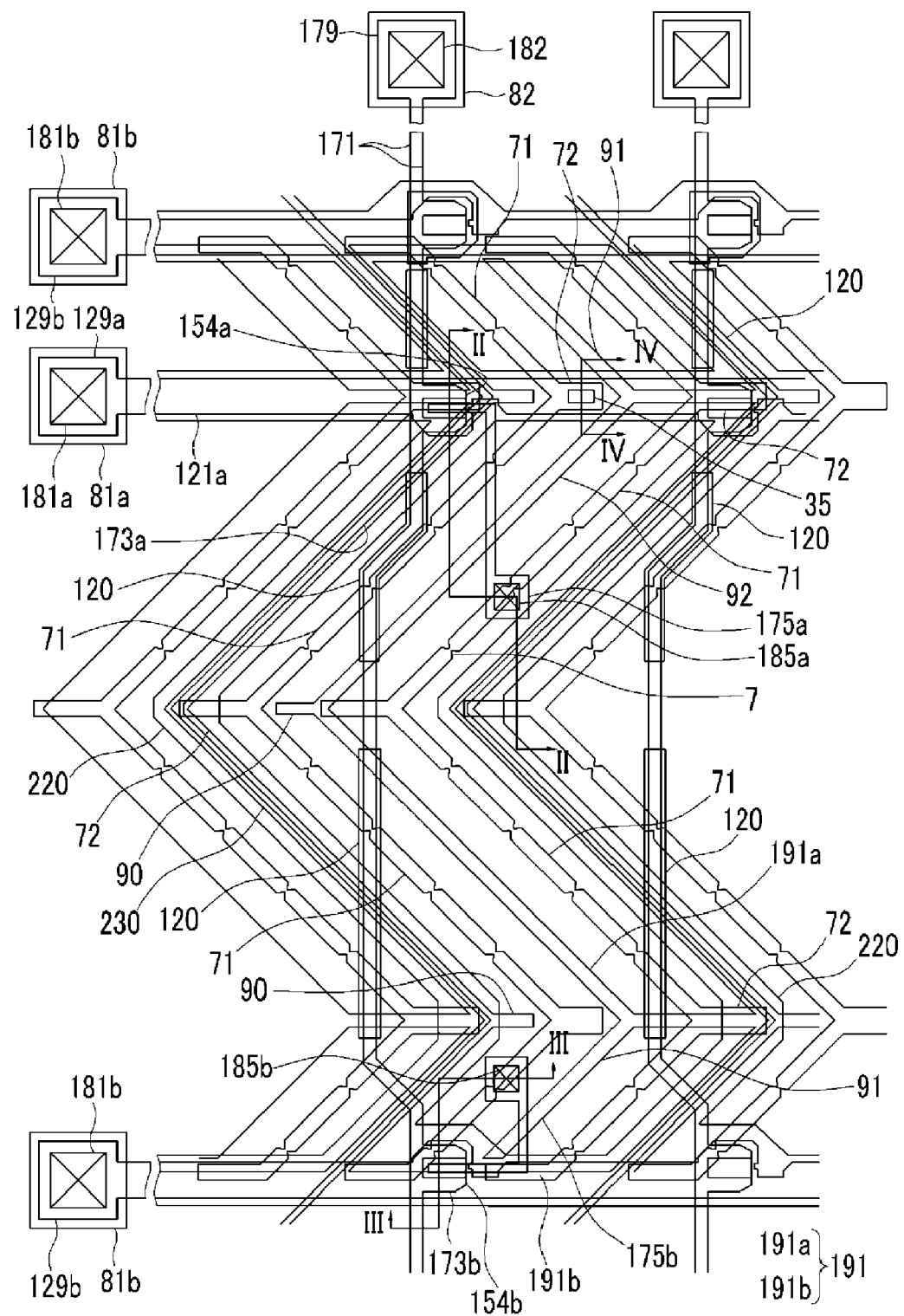
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art will realize, the described embodiments may be modified in various different ways without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Figure 2:
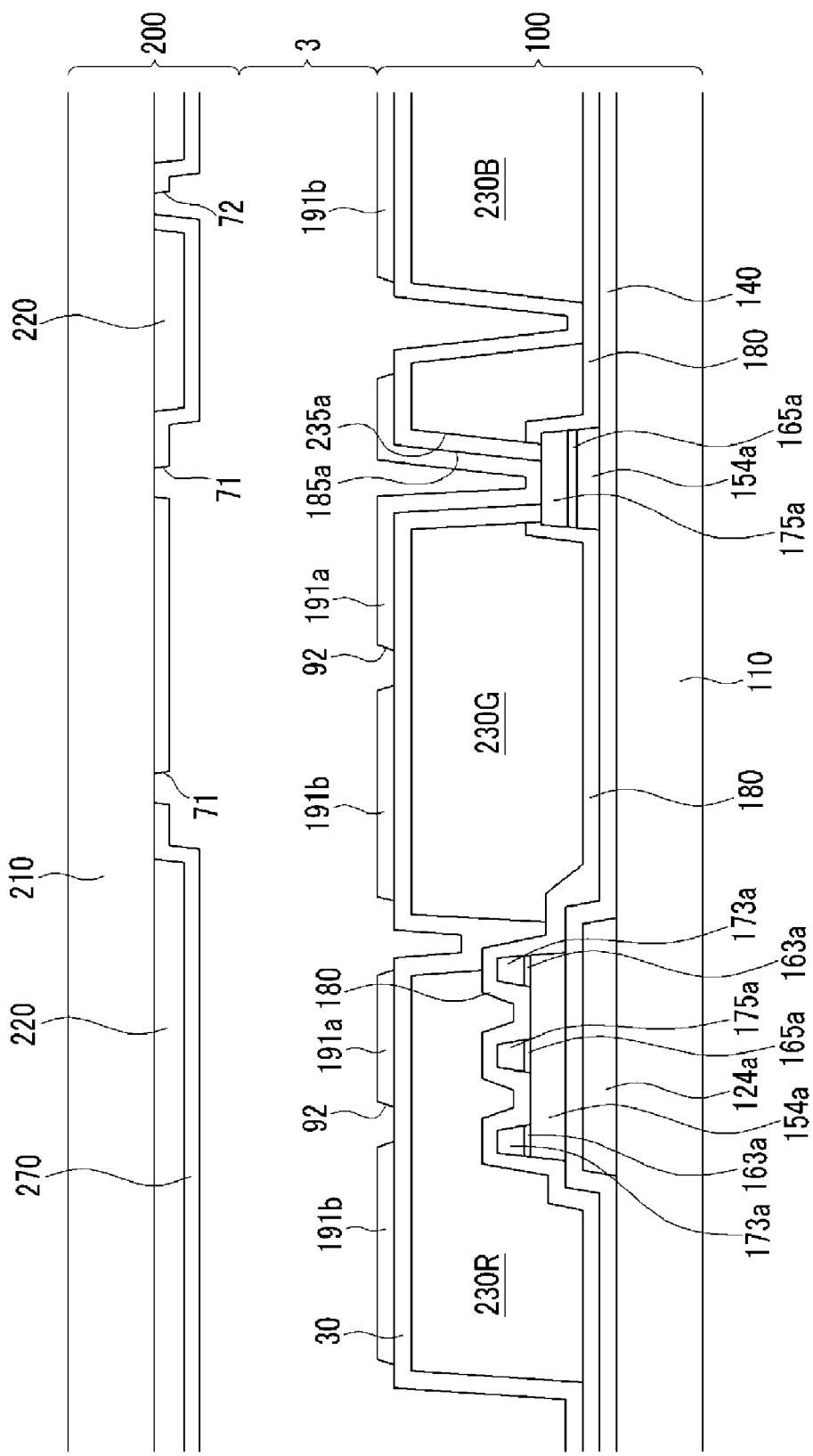
FIG. 2 is a cross-sectional view taken along the line II-II of FIG. 1.
Figure 3:
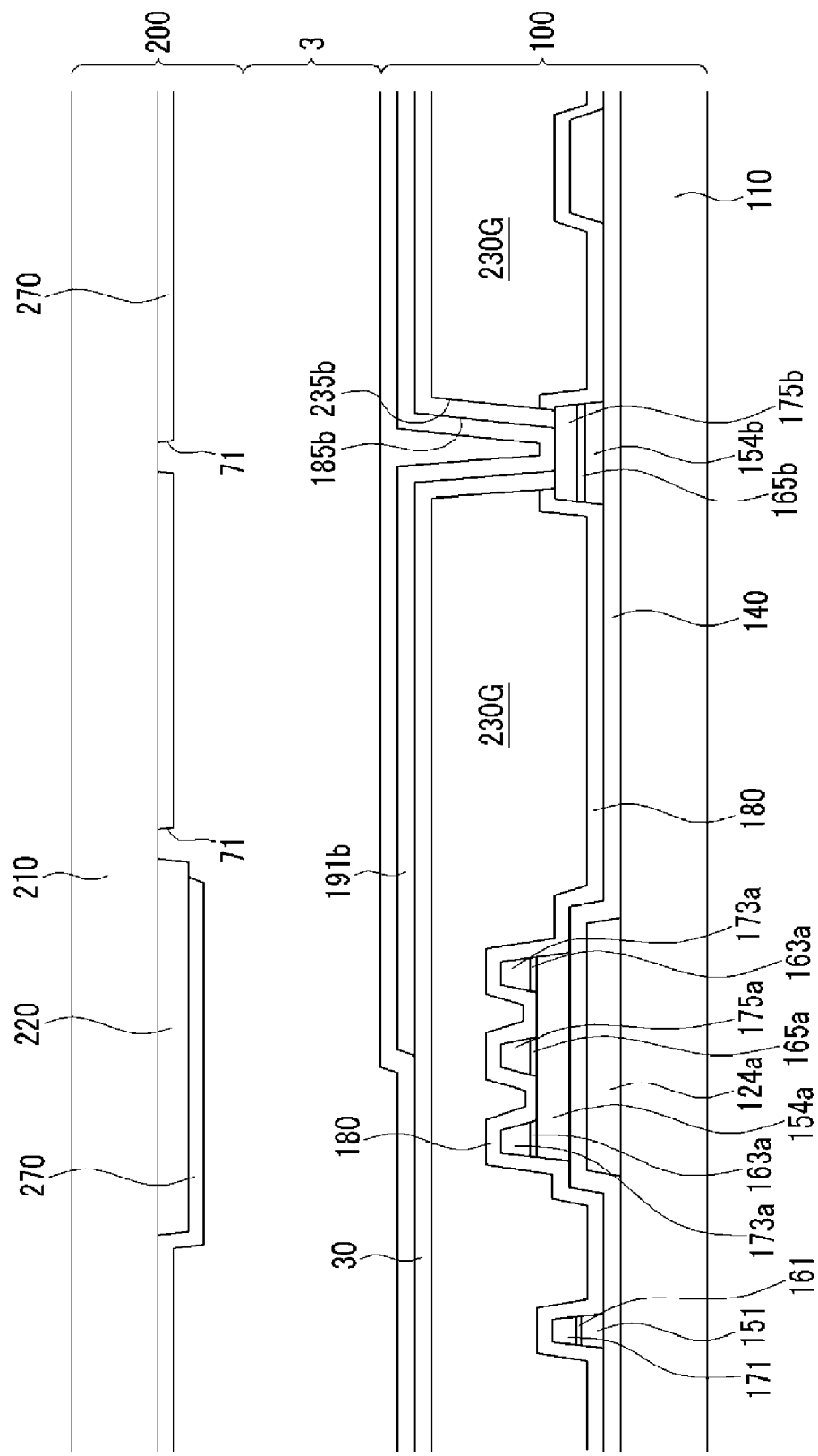
FIG. 3 is a cross-sectional view taken along the line III-III of FIG. 1.
Figure 4:
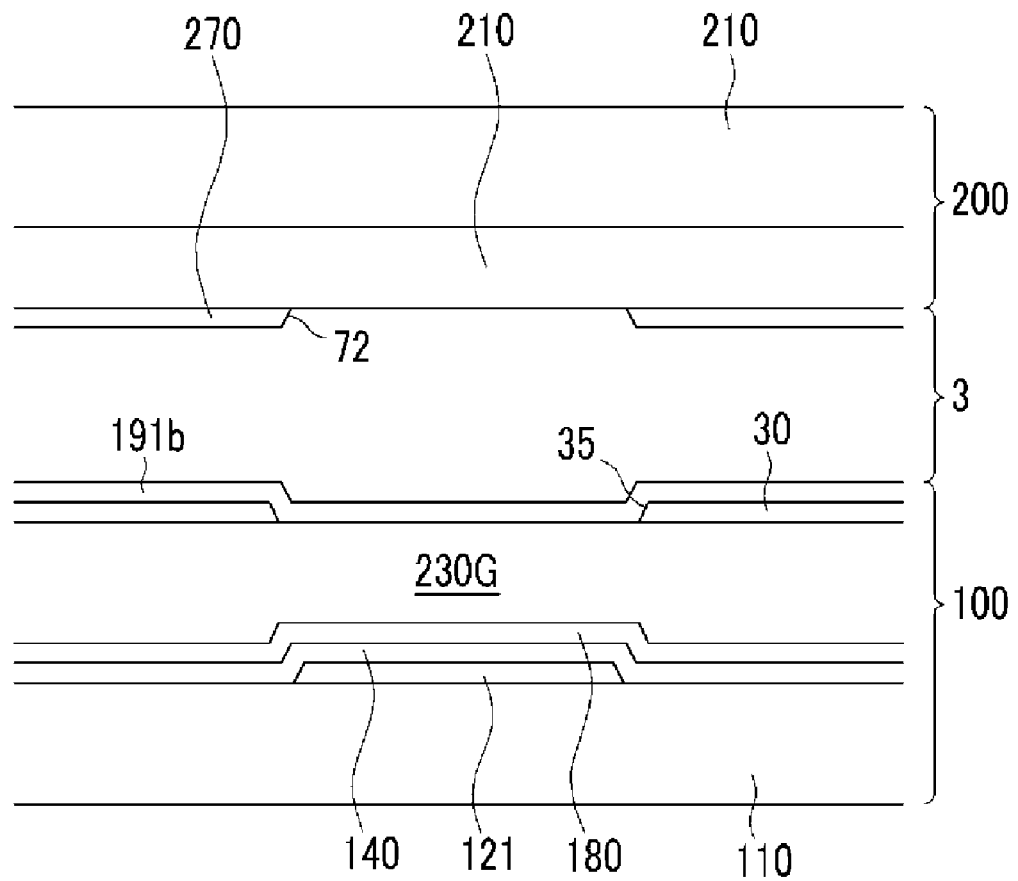
FIG. 4 is a cross-sectional view taken along the line IV-IV of FIG. 1.

FIG. 1 is a layout view of a liquid crystal display according to an exemplary embodiment of the present invention, FIG. 2 is a cross-sectional view taken along the line II-II of FIG. 1, FIG. 3 is a cross-sectional view taken along the line III-III of FIG. 1, and FIG. 4 is a cross-sectional view taken along the line IV-IV of FIG. 1.

Referring to FIG. 1 to FIG. 4, a liquid crystal display according to the an exemplary embodiment includes a thin film transistor array panel 100 and a common electrode panel 200 facing each other, and a liquid crystal layer 3 interposed between the two display panels 100 and 200.

A plurality of gate lines 121a and 121b and a plurality of light blocking films 120 are formed on an insulation substrate 110 made of, for example, transparent glass or plastic.

The gate lines 121a and 121b transmit gate signals and extend substantially in a transverse direction. Each of the gate lines 121a and 121b includes a plurality of first and second gate electrodes 124a and 124b protruding upward, and end portions 129a and 129b having a wide area for connecting to other layers or an external driving circuit (not shown).

The light blocking films 120 mainly extend in a longitudinal direction, and are divided into a plurality of portions so as to not be shorted with the first and second gate lines 121a and 121b and storage electrode lines 131.

A gate insulating layer 140 made of, for example, silicon nitride (SiNx) or silicon oxide (SiOx) is formed on the light blocking films 120 and the gate lines 121a and 121b.

A plurality of semiconductor stripes 151 made of, for example, hydrogenated amorphous silicon or polysilicon are formed on the gate insulating layer 140. The semiconductor stripes 151 mainly extend in the longitudinal direction, and respectively include a plurality of protrusions 154a and 154b protruding toward the gate electrodes 124a and 124b.

A plurality of ohmic contact stripes and islands 161, 165a, and 165b are formed on the semiconductor stripes 151. The ohmic contacts 161, 165a, and 165b can be made of a material such as n+ hydrogenated amorphous silicon in which an n-type impurity such as phosphor is doped with a high density, or can be made of silicide. The ohmic contact stripes 161 include a plurality of protrusions 163a and 163b, and the protrusions 163a and 163b and the ohmic contact islands 165a and 165b are disposed in pairs on the protrusions 154a and 154b, respectively, of the semiconductor stripes 151.

A plurality of data lines 171 and a plurality of first and second drain electrodes 175a and 175b are formed on the gate insulating layer 140 and the ohmic contacts 161, 165a, and 165b, respectively.

The data lines 171 transfer data signals and mainly extend in the longitudinal direction, thereby intersecting the gate lines 121a and 121b, and are curved at least two times. Each data line 171 includes a plurality of first and second source electrodes 173a and 173b extending toward the first and second gate electrodes 124a and 124b, respectively, and an end portion 179 with a wide area for connection with a different layer or an external driving circuit.

The first and second drain electrodes 175a and 175b are separated from each other, and also are separated from the data lines 171. Each of the drain electrodes 175a and 175b faces the first and second source electrodes 173a and 173b, respectively, with respect to the gate electrodes 124a and 124b, and includes an expansion having a side area at one end thereof. The drain electrodes 175a and 175b facing the source electrodes 173a and 173b are enclosed by the source electrodes 173a and 173b, which have a "C" shape surrounding a portion the respective drain electrodes 175a and 175b.

The first gate electrode 124a, the first source electrode 173a, and the first drain electrode 173a form the first thin film transistor along with the first semiconductor 154a. The second gate electrode 124b, the second source electrode 173b, and the second drain electrode 173b form the second thin film transistor along with the second semiconductor 154b. The channels of the first and second thin film transistors are respectively formed in the first and second semiconductors 154a and 154b. A first channel is formed between the first source electrode 173a and the first drain electrode 175a and a second channel is formed between the second source electrode 173b and the second drain electrode 175b.

The ohmic contacts 163a, 163b, 165a, and 165b exist between the underlying semiconductors 154a and 154b and the overlying data lines 171a and 171b and drain electrodes 173a and 173b, thereby reducing contact resistance therebetween. Some portions of each of the semiconductor islands 154a and 154b including, for example, a portion between the source electrodes 173a and 173b and the drain electrodes 175a and 175b, are exposed, without being covered by the ohmic contacts.

Each of the data lines 171 overlaps the light blocking films 120, and the light blocking films 120 include curved portions corresponding to the shape of the data lines 171. The width of the light blocking films 120 may be equal to or wider than the width of the data lines 171.

A passivation layer 180 made of, for example, silicon nitride is formed on the data lines 171, the drain electrodes 175a and 175b, the exposed protrusions 154a and 154b of the semiconductor 151, and the gate insulating layer 140.

Color filters 230R, 230G, and 230B are formed on the passivation layer 180, and the color filters 230R, 230G, and 230B are curved corresponding to a pixel electrode 191 that is described further below. The boundary of the neighboring color filters 230R, 230G, and 230B is adjacent the boundary of the neighboring pixel electrodes 191.

The passivation layer 180 and the color filters 230R, 230G, and 230B have openings 235a and 235b exposing the drain electrodes 175a and 175b, respectively. The openings 235a and 235b facilitate formation of contact holes 185a and 185b.

A cover 30 made of silicon nitride to prevent an upper layer from being contaminated by gas generated from the color filters 230R, 230G, and 230B is formed on the color filters 230R, 230G, and 230B.

The cover 30 has the contact holes 185a and 185b respectively exposing the first and second drain electrodes 175a and 175b. These contact holes 185a and 185b are disposed in the openings 235a and 235b formed in the color filters 230R, 230G, and 230B, such that the openings 235a and 235b of the color filters 230R, 230G, and 230B are covered by the cover 30.

This configuration prevents the contamination by gas generated at the openings 235a and 235b from the color filters 230R, 230G, and 230B.

Also, the cover 30 and the passivation layer 180 have a contact hole 182 exposing the end portion 179 of the data line 171, the cover 30, and the passivation layer 180, and the gate insulating layer 140 has contact holes 181a and 181b respectively exposing the end portions 129a and 129b of the gate lines 121a and 121b.

Also, the cover 30 includes a dummy hole 35 exposing the color filters 230R, 230G, and 230B or a plurality of dummy holes 35 respectively exposing the color filters 230R, 230G, and 230B. The dummy hole(s) 35 is formed on the portion corresponding to the gate lines 121, and is covered by the second subpixel electrode 191*b*.

The dummy hole(s) 35 exposes the color filters 230R, 230G, and 230B before forming a pixel electrode 191 on the cover 30, thereby functioning as a gas emission portion for emitting the gas generated from the color filters 230R, 230G, and 230B.

That is, the cover 30 covers the color filters 230R, 230G, and 230B such that the cover 30 prevents emission of the gas between the color filters 230R, 230G, and 230B, and the cover 30. The cover 30 may be damaged at the portion of the contact holes 185*a* and 185*b* by thermal stress and external impact after filling the liquid crystal. As a result, gas may be emitted at the damaged portion, thereby generating gas bubbles, which can prevent the liquid crystal from being completely filled.

Accordingly, the dummy hole(s) 35 exposing the color filters 230R, 230G, and 230B is formed before forming the pixel electrode 191 on the cover 30 such that the gas of the color filters 230R, 230G, and 230B may be sufficiently emitted to prevent the formation of gas bubbles such that the liquid crystal may be completely filled.

Also, the openings 235*a* and 235*b* and the dummy hole(s) 35 are covered by the cover 30 and the pixel electrode 191 such that a slight change of the color coordinates may be prevented from being generated by the by-products of the color filters 230R, 230G, and 230B generated when forming the openings 235*a* and 235*b* and the dummy hole(s) 35.

The shape of the dummy hole 35 may vary. For example, a dummy hole 35 may be shaped as a circle or a quadrangle, and the size of one dummy hole 35 is in the range of, for example, about 10 $\mu m^2$-about 500 $\mu m^2$. Also, the number of the dummy holes 35 in each pixel may be one or more.

The pixel electrode 191 and contact assistants 81*a*, 81*b*, and 82 are formed on the cover 30 and the dummy hole 35. The pixel electrode 191 includes a pair of first and second subpixel electrodes 191*a* and 191*b* separated from each other.

The first subpixel electrode 191*a* is connected to the first drain electrode 175*a* through the contact hole 185*a*, and the second subpixel electrode 191*b* is connected to the second drain electrode 175*b* through the contact hole 185*b*.

One data line 171 overlaps with more than one adjacent pixel electrode 191. The data line 171 overlaps not only with its pixel electrode 191 that is connected through the first and second thin film transistors, but also with a pixel electrode 191 adjacent to its pixel electrode 191 because of the bent configuration of pixel electrode 191.

The first subpixel electrode 191*a* and the second subpixel electrode 191*b* are adjacent to each other in the row direction, and are separated from each other via a gap 92 interposed therebetween. The first subpixel electrode 191*a* has cutouts 90 and 91, and the gap 92 is connected to an upper and a lower oblique cutout 91 of the first subpixel electrode 191*a*. Also, the transverse cutout 90 is connected to the gap 92.

The second subpixel electrode 191*b* has a structure that is bent, for example, three times, and the positional relationship and the bent direction of the first and second subpixel electrodes 191*a* and 191*b* may be varied and modified by allowing the pixel electrode 191 to inversely or symmetrically move up and down or left and right, or to move rotationally.

The first and second subpixel electrodes 191*a* and 191*b* respectively receive the data voltage from the first and second drain electrodes 175*a* and 175*b*. Different data voltages set for one input image signal are supplied to a pair of subpixel electrodes 191*a* and 191*b*. The amplitude thereof can be set according to the size and shape of the subpixel electrodes 191*a* and 191*b*. The areas of the first and second subpixel electrodes 191*a* and 191*b* can be different from each other. For example, the first subpixel electrode 191*a* receives a higher voltage compared to the second subpixel electrode 191*b*, and has a smaller area than the second subpixel electrode 191*b*.

The width of the light blocking film 120 may be larger than the width of the data line 171 when considering the aperture ratio and the arrangement error of the process, or they may be equal to each other.

Next, the common electrode panel 200 will be described.

A light blocking member 220 for preventing light leakage is formed on an insulation substrate 210 made of, for example, transparent glass or plastic.

A common electrode 270 is formed on the substrate 210 and the light blocking member 220. The common electrode 270 is made of a transparent conductor such as, for example, ITO or IZO.

The common electrode 270 has a plurality of cutouts 71 and 72. The cutouts 71 and 72 include notches 7 with a triangular shape. Alternatively, the notches 7 may have a quadrangular, a trapezoidal, or a semicircular shape, and may be convex or concave. These notches 7 determine the arrangement direction of liquid crystal molecules disposed on the boundary of the regions corresponding to the cutouts 71 and 72.

The liquid crystal layer 3 is positioned between the common electrode panel 200 and the thin film transistor array panel 100.

The first and second subpixel electrodes 191*a* and 191*b* applied with the data voltage and the common electrode 270 applied with the common voltage form first and second liquid crystal capacitors, thereby maintaining the applied voltage after the thin film transistor is turned off. Each liquid crystal capacitor includes the liquid crystal layer 3 as a dielectric material.

Next, a display device according to an exemplary embodiment of the present invention will be described with reference to FIG. 5 and FIG. 6.

Figure 5:
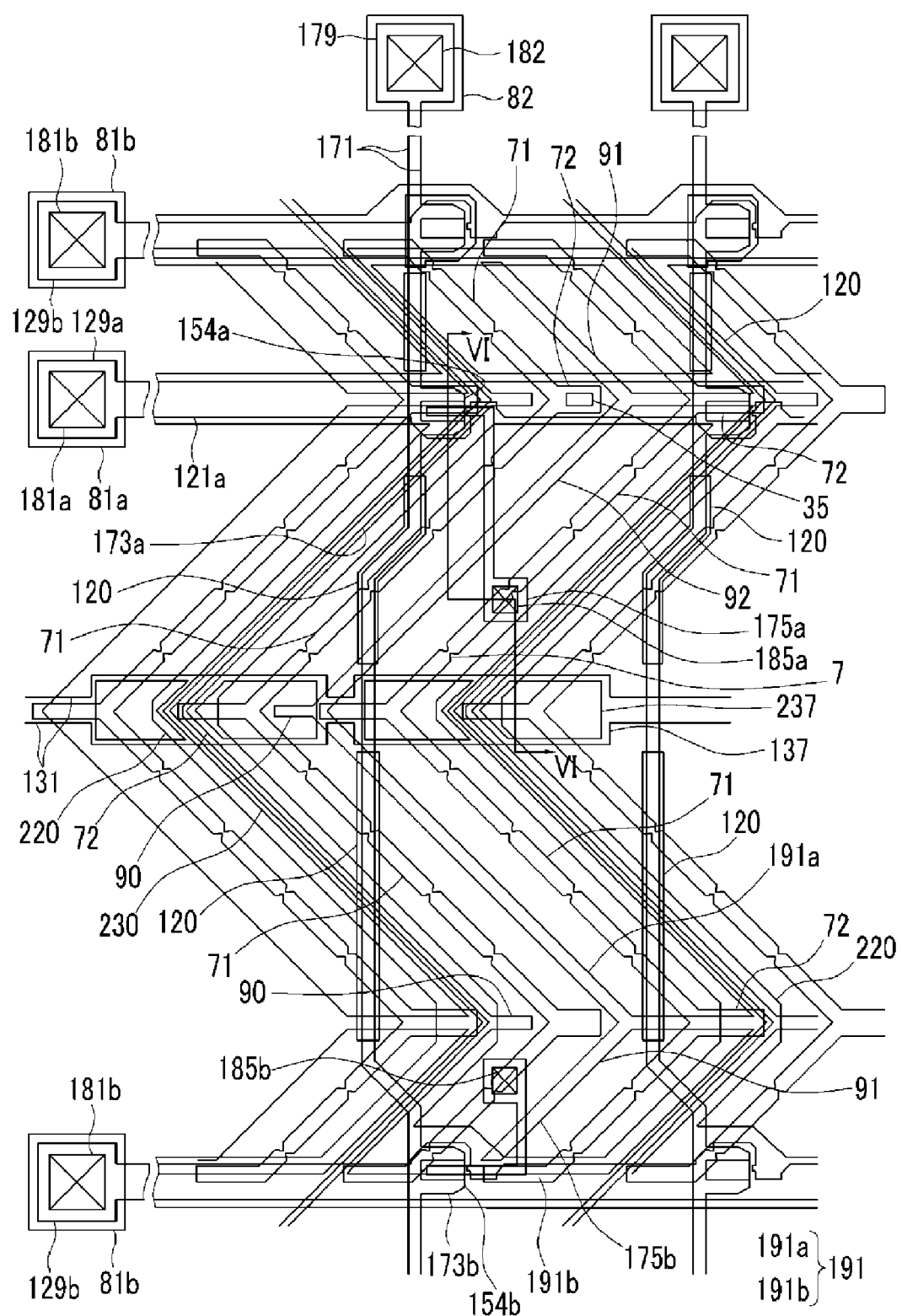
FIG. 5 is a layout view of a liquid crystal display according to an exemplary embodiment of the present invention.
Figure 6:
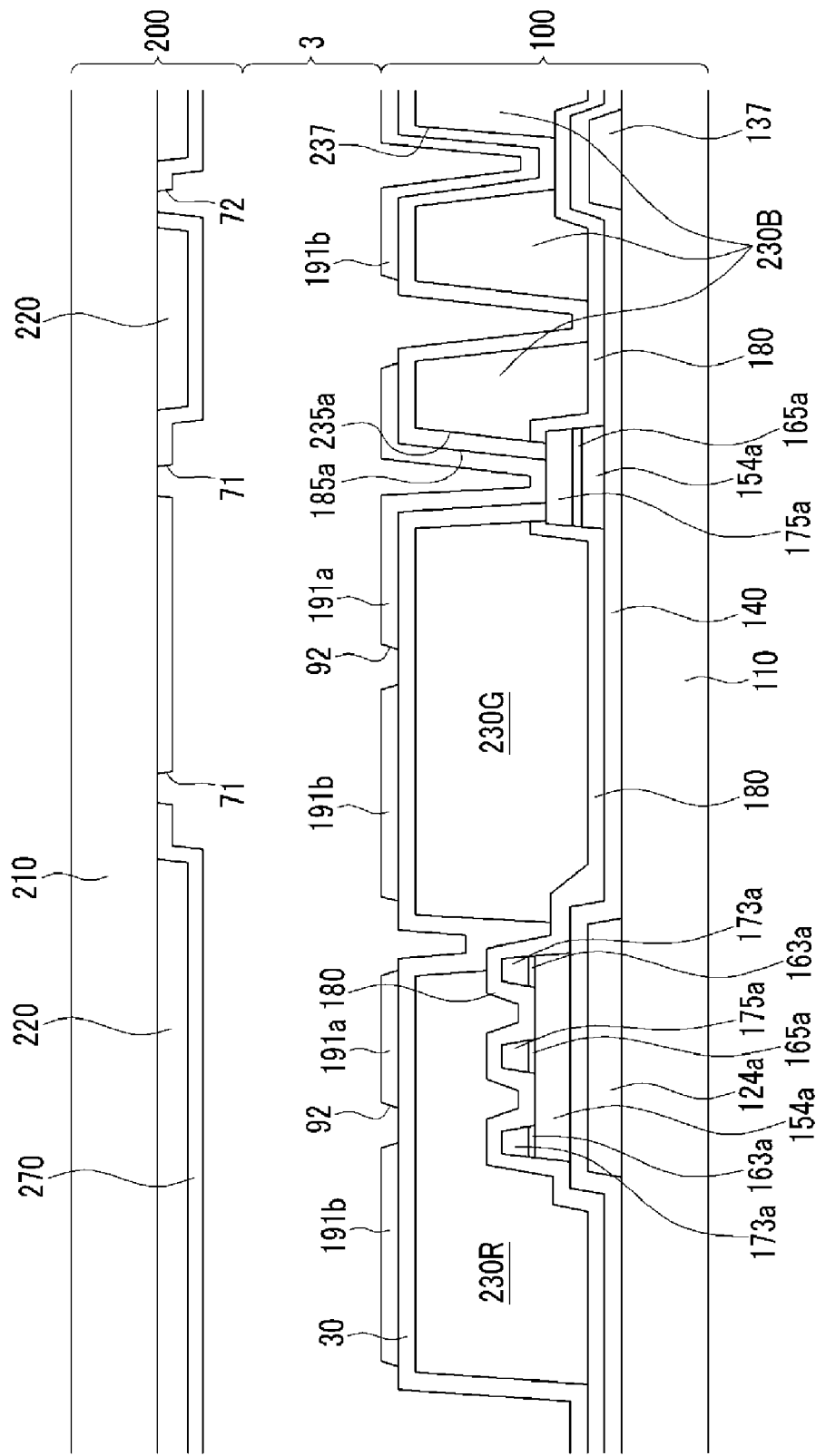
FIG. 6 is a cross-sectional view of the liquid crystal display shown in FIG. 5 taken along the line VI-VI.

FIG. 5 is a layout view of a liquid crystal display according to an exemplary embodiment of the present invention, and FIG. 6 is a cross-sectional view of the liquid crystal display shown in FIG. 5 taken along the line VI-VI.

As shown in FIG. 5 and FIG. 6, a liquid crystal display shown in FIG. 5 according to the present exemplary embodiment includes a thin film transistor array panel 100 and a common electrode panel 200 facing each other, and a liquid crystal layer 3 interposed between the two display panels 100 and 200, like the liquid crystal display according to the exemplary embodiment of FIG. 1.

However, different from the liquid crystal display according to the exemplary embodiment of FIG. 1, the thin film transistor array panel 100 of the liquid crystal display according to the exemplary embodiment of FIG. 5 and FIG. 6 includes storage electrode lines 131 formed on the substrate 110.

The storage electrode lines 131 receive a predetermined voltage, and are mainly extended in the transverse horizontal direction. Each of the storage electrode lines 131 is positioned between the first gate line 121*a* and the second gate line 121*b*, and maintains an equal or almost equal distance from the two gate lines 121*a* and 121*b*. Each storage electrode line 131 includes a storage electrode 137 extending downward and upward, and the storage electrode 137 has up and down symmetry with respect to the storage electrode line 131.

A gate insulating layer 140 is formed on the gate lines 121*a* and 121*b*, the light blocking film 120, like the liquid crystal display according to the exemplary embodiment of FIG. 1, and on the storage electrode line 131. The semiconductors 151, 154a, and 154b, the ohmic contacts 161, 163a, 163b, 165a, and 165b, the data lines 171, the drain electrodes 175a and 175b, the passivation layer 180, and the color filters 230R, 230G, and 230B are sequentially formed on the gate insulating layer 140.

The passivation layer 180 and the color filters 230R, 230G, and 230B have openings 235a and 235b exposing the drain electrodes 175a and 175b, and an opening 237 formed on the storage electrode 137. The openings 235a and 235b exposing the drain electrodes 175a and 175b facilitate the formation of the contact holes 185a and 185b, and the opening 237 disposed on the storage electrode 137 reduces the thickness of the dielectric material required to form a storage capacitance, thereby increasing the storage capacitance.

A cover 30 made of silicon nitride to prevent an upper layer from being contaminated by gas generated from the color filters 230R, 230G, and 230B is formed on the color filters 230R, 230G, and 230B.

The cover 30 has contact holes 185a and 185b exposing the first and second drain electrodes 175a and 175b, a contact hole 182 exposing the end portion 179 of the data line 171, contact holes 181a and 181b exposing the end portions 129a and 129b of the gate lines 121a and 121b, and a dummy hole 35 or a plurality of dummy holes 35 exposing the color filters 230R, 230G, and 230B.

A pixel electrode 191 is formed on the cover 30 and the dummy hole(s) 35.

As described above in connection with FIG. 1, the dummy hole(s) 35 exposing the color filters 230R, 230G, and 230B is formed before forming the pixel electrode 191 on the cover 30 such that the gas of the color filters 230R, 230G, and 230B may be sufficiently emitted to allow the liquid crystal to be completely filled.

Also, the openings 235a and 235b and the dummy hole(s) 35 are covered by the cover 30 and the pixel electrode 191 such that the slight change of the color coordinates may be prevented from being generated by the by-products of the color filters 230R, 230G, and 230B generated when forming the openings 235a and 235b and the dummy hole(s) 35.

The shape of the dummy hole 35 may vary. For example, the dummy hole 35 may be shaped as a circle or a quadrangle, and the size of one dummy hole 35 may be in the range of, for example, about 10 μm²-about 500 μm². Also, the number of the dummy holes 35 in each pixel may be one or more.

Next, a display device according to an exemplary embodiment of the present invention will be described with reference to FIG. 7 to FIG. 9.

Figure 7:
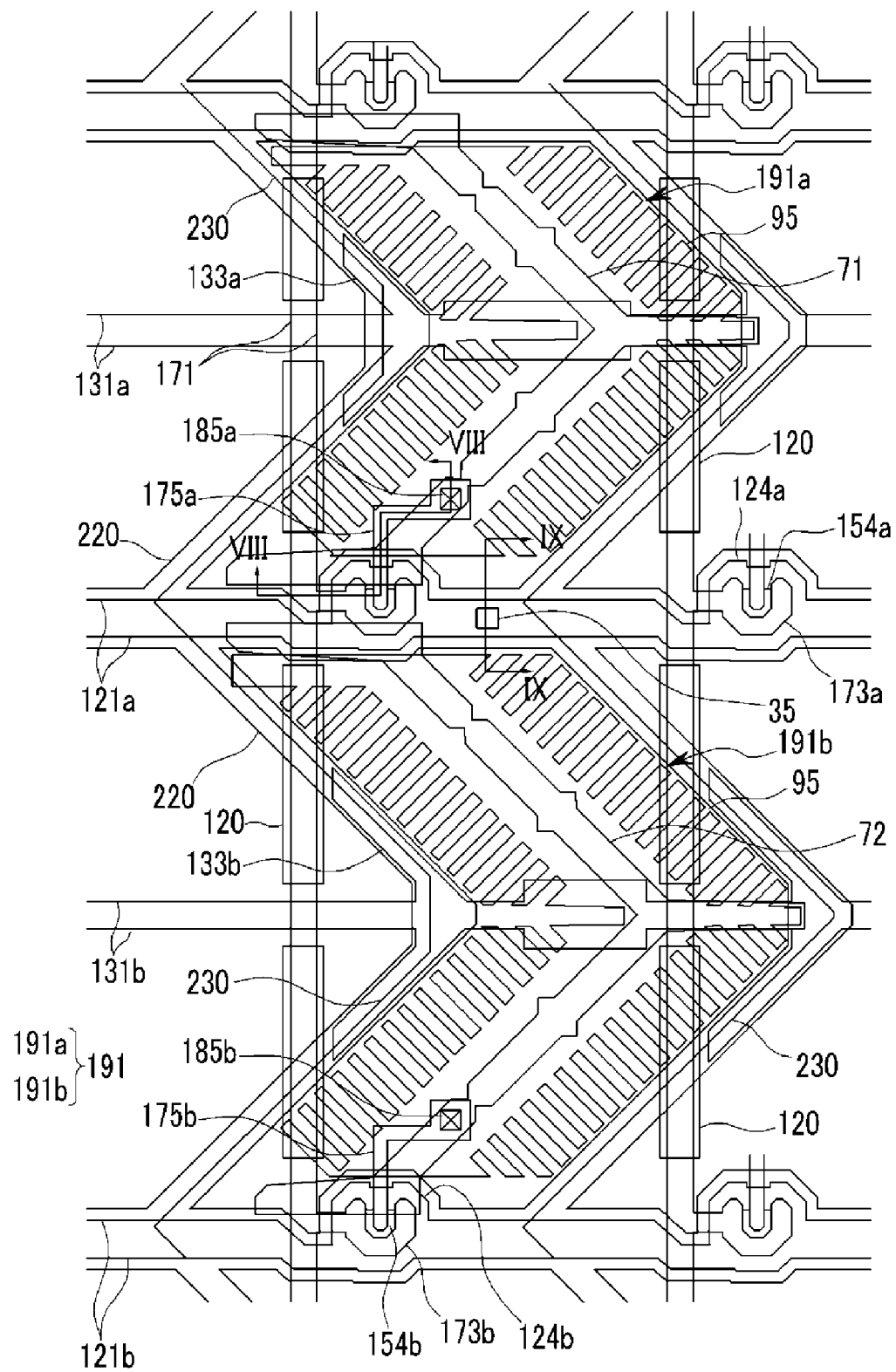
FIG. 7 is a layout view of a liquid crystal display according to an exemplary embodiment of the present invention.
Figure 8:
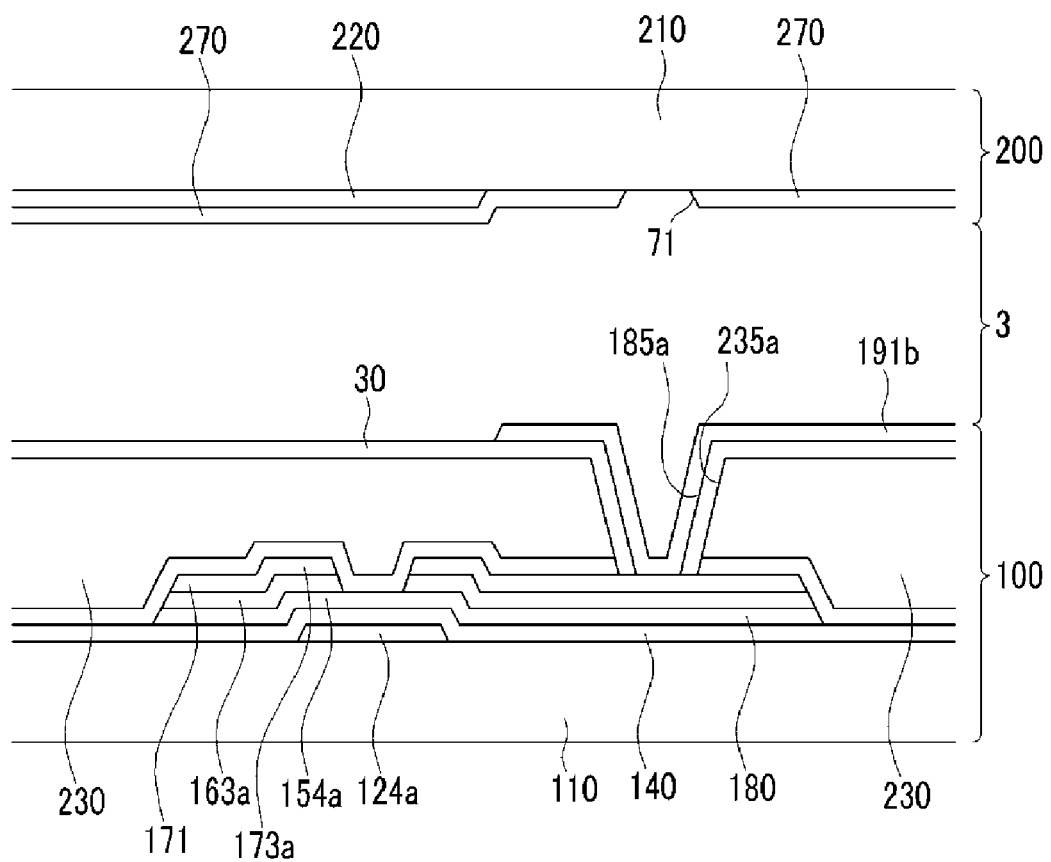
FIG. 8 is a cross-sectional view of the liquid crystal display shown in FIG. 7 taken along the line VIII-VIII.
Figure 9:
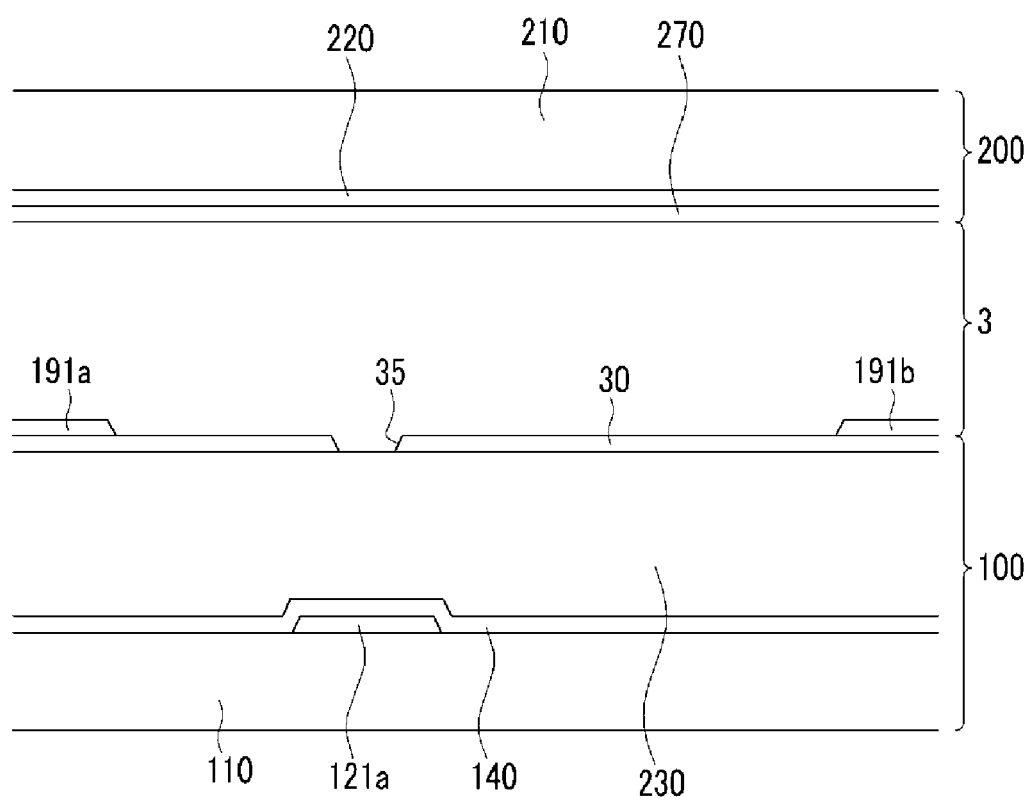
FIG. 9 is a cross-sectional view of the liquid crystal display shown in FIG. 7 taken along the line IX-IX.

FIG. 7 is a layout view of a liquid crystal display according to an exemplary embodiment of the present invention, FIG. 8 is a cross-sectional view of the liquid crystal display shown in FIG. 7 taken along the line VIII-VIII, and FIG. 9 is a cross-sectional view of the liquid crystal display shown in FIG. 7 taken along the line IX-IX.

As shown in FIG. 7 to FIG. 9, a liquid crystal display shown in FIG. 7 according to the present exemplary embodiment includes a thin film transistor array panel 100 and a common electrode panel 200 facing each other, and a liquid crystal layer 3 interposed between two display panels 100 and 200, like the liquid crystal display according to the exemplary embodiment of FIG. 1.

However, different from the liquid crystal display according to the exemplary embodiment of FIG. 1, the first subpixel electrode 191a and the second subpixel electrode 191b are adjacent to each other in the column direction, and the liquid crystal display according to the exemplary embodiment of FIG. 7 to FIG. 9 includes storage electrode lines 131 formed on the substrate.

The gate lines 121a and 121b, the light blocking film 120, and the storage electrode lines 131a and 131b are formed on the substrate 110. A gate insulating layer 140 is formed on the gate lines 121a and 121b, the light blocking film 120, and the storage electrode line 131a and 131b. The semiconductors 154a and 154b, the ohmic contacts 163a and 165a, the data lines 171, the drain electrodes 175a and 175b, the passivation layer 180, and the color filters 230 are sequentially formed on the gate insulating layer 140.

The color filters 230 of red, green, and blue are alternately arranged, and the passivation layer 180 and the color filters 230 have the openings 235a and 235b exposing the drain electrodes 175a and 175b. The openings 235a and 235b facilitate the formation of the contact holes 185a and 185b.

A cover 30 made of silicon nitride to prevent an upper layer from being contaminated by gas generated from the color filters 230 is formed on the color filters 230.

The cover 30 has the contact holes 185a and 185b exposing the first and second drain electrodes 175a and 175b, and the dummy hole(s) 35 exposing the color filters 230.

The dummy hole(s) 35 exposes the color filters 230, thereby functioning as a gas emission portion for emitting the gas generated from the color filters 230.

Accordingly, the dummy hole(s) 35 exposing the color filters 230 is formed before forming the pixel electrode 191 on the cover 30 such that the gas of the color filters 230 may be sufficiently emitted to allow the liquid crystal to be completely filled.

According to an embodiment, the dummy hole 35 is not formed for all pixels of red, blue, and green, but is formed for two pixels or one pixel, thereby limiting the total area of the dummy hole 35.

The shape of the dummy hole 35 may vary. For example, the shape of the dummy hole 35 may be a circle or a quadrangle, and the size of one dummy hole 35 may be in the range of, for example, about 10 μm²-about 200 μm².

This configuration is to minimize the slight change of the color coordinates due to the color filter(s) 230 exposed from the dummy hole(s) 35.

A pixel electrode 191 is formed on the cover 30. The pixel electrode 191 includes a pair of first and second subpixel electrodes 191a and 191b separated from each other.

The first subpixel electrode 191a is connected to the first drain electrode 175a through the contact hole 185a, and the second subpixel electrode 191b is connected to the second drain electrode 175b through the contact hole 185b.

The first subpixel electrode 191a and the second subpixel electrode 191b are adjacent to each other in the column direction, and have the cutout 90 and minute slits 95. The first subpixel electrode 191a and the second subpixel electrode 191b are bent, for example, once, and the area of the first pixel electrode 191a may be different from the area of the second pixel electrode 191b.

Next, a display device according to an exemplary embodiment of the present invention will be described with reference to FIG. 10 to FIG. 12.

Figure 10:
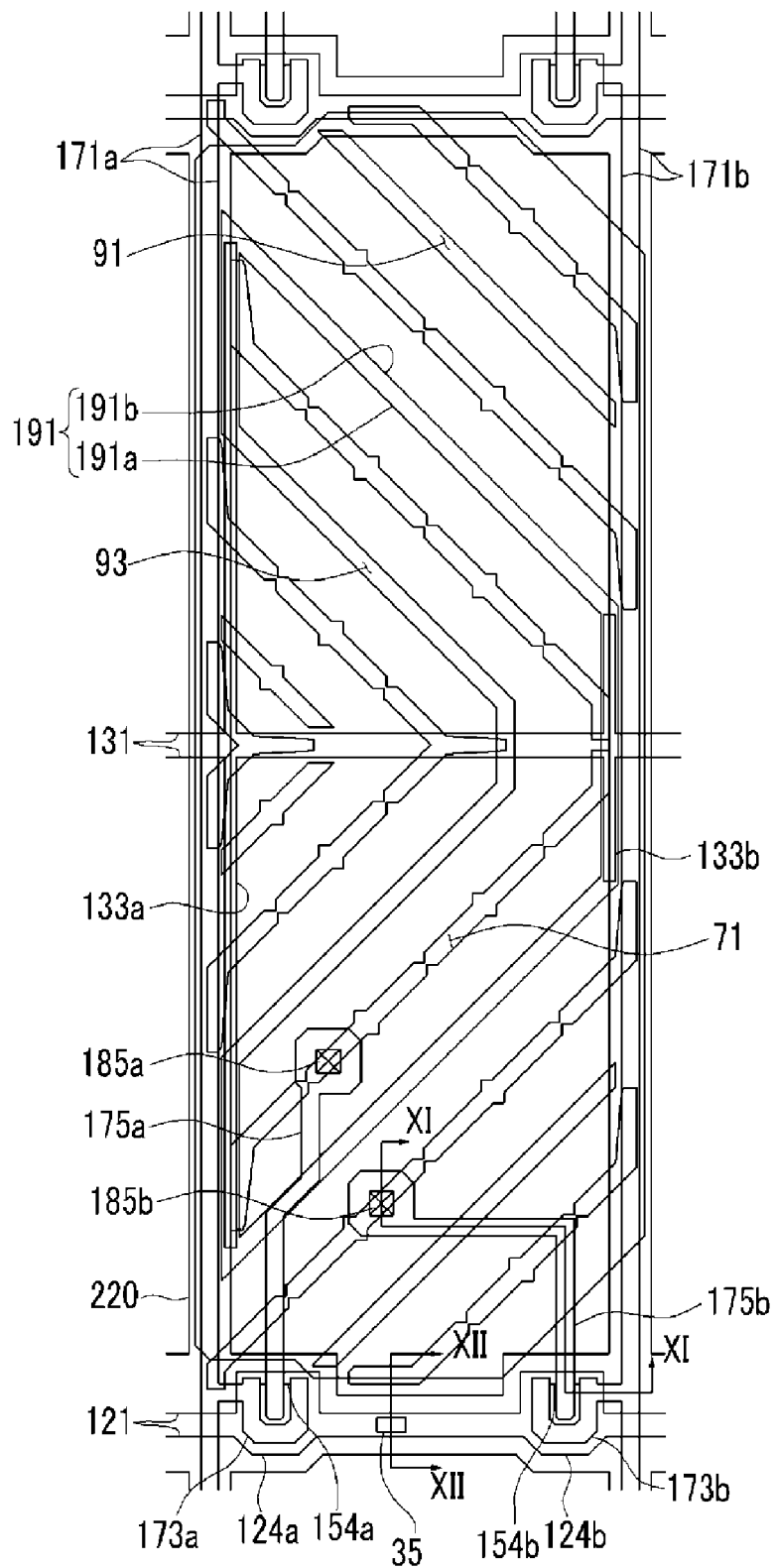
FIG. 10 is a layout view of a liquid crystal display according to an exemplary embodiment of the present invention.
Figure 11:
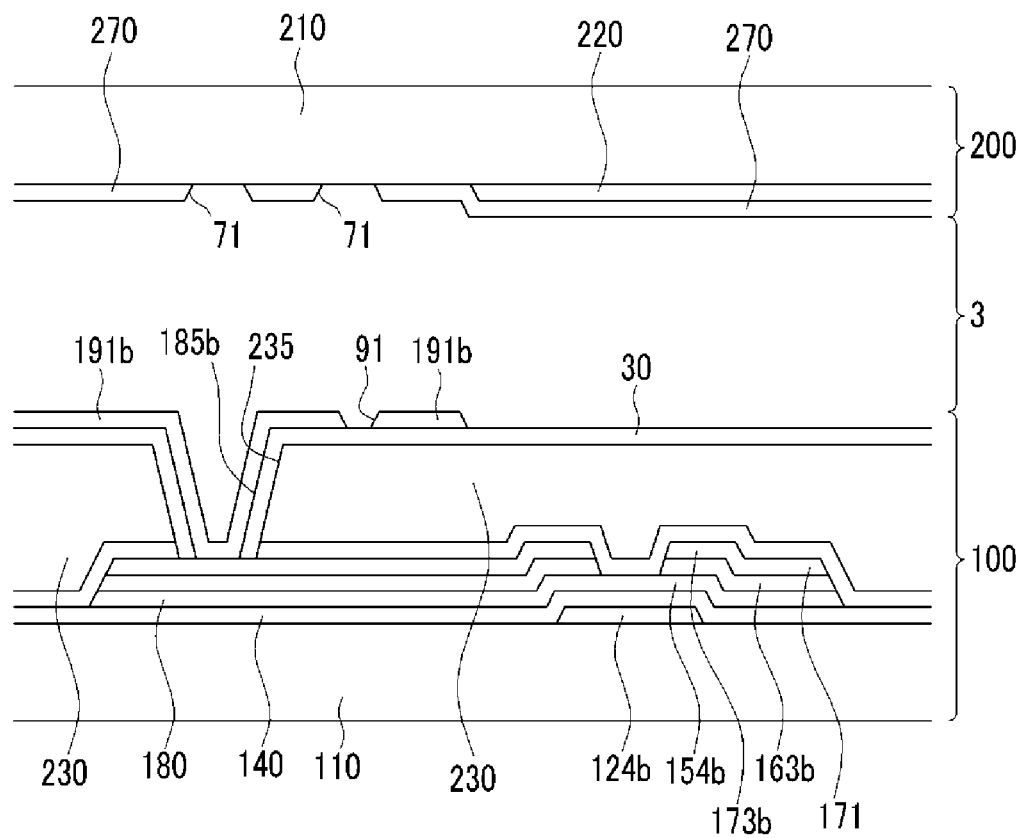
FIG. 11 is a cross-sectional view of the liquid crystal display shown in FIG. 10 taken along the line XI-XI.
Figure 12:
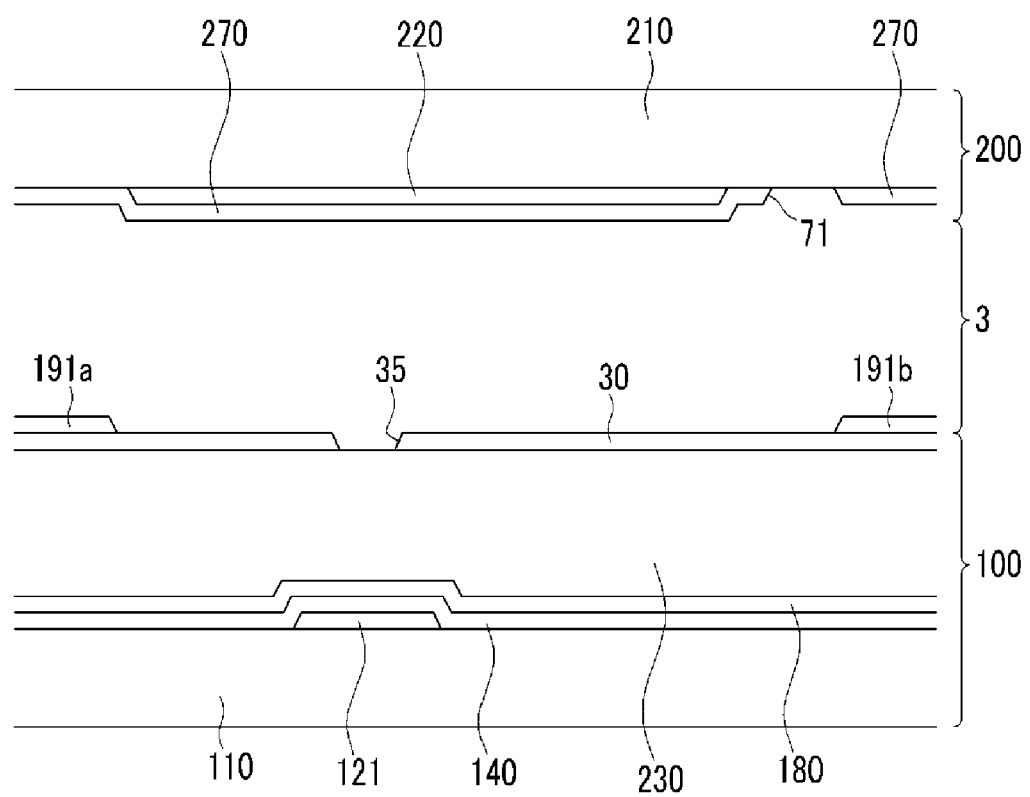
FIG. 12 is a cross-sectional view of the liquid crystal display shown in FIG. 10 taken along the line XII-XII.

FIG. 10 is a layout view of a liquid crystal display according to another exemplary embodiment of the present invention, FIG. 11 is a cross-sectional view of the liquid crystal display shown in FIG. 10 taken along the line XI-XI, and FIG. 12 is a cross-sectional view of the liquid crystal display shown in FIG. 10 taken along the line XII-XII.

As shown in FIG. 10 to FIG. 12, a liquid crystal display shown in FIG. 10 according to the present exemplary embodiment includes a thin film transistor array panel 100 and a common electrode panel 200 facing each other, and a liquid crystal layer 3 interposed between two display panels 100 and 200, like the liquid crystal display according to the exemplary embodiment of FIG. 1.

However, different from the liquid crystal display according to the exemplary embodiment of FIG. 1, the pixel electrode 191 is not bent, and one gate line 121 is connected to two thin film transistors.

A gate line 121 and a storage electrode line 131 are formed on the substrate 110, and the gate line 121 includes the first and second gate electrodes 124a and 124b protruding up and down. The storage electrode line 131 includes storage electrodes 133a and 133b extending downward and upward, and the storage electrodes 133a and 133b have up and down symmetry with respect to the storage electrode line 131.

A gate insulating layer 140 is formed on the gate line 121 and the storage electrode line 131, and the first and second semiconductors 154a and 154b are formed on the gate insulating layer 140. The first semiconductor 154a overlaps the first gate electrodes 124a and the second semiconductor 154b overlaps the second gate electrodes 124b.

A pair of first ohmic contact islands 163a and 165a are formed on the first semiconductor 154a, and a pair of second ohmic contact islands (not shown) are formed on the second semiconductor 154b.

The first and second data lines 171a and 171b and the first and second drain electrodes 175a and 175b are formed on the ohmic contacts 163a and 165a and the gate insulating layer 140.

The first and second data lines 171a and 171b transmit data signals, and extend substantially in the longitudinal direction thereby intersecting the gate line 121 and the storage electrode line 131. The first data line 171a includes a first source electrode 173a that is extended toward the first gate electrode 124a and is curved with a "U" shape. Likewise, the second data line 171b includes a second source electrode 173b that is extended toward the second gate electrode 124b and is curved with a "U" shape.

The drain electrodes 175a and 175b are separated from the data lines 171a and 171b. Each drain electrode 175a and 175b includes one end enclosed by the source electrodes 173a and 173b, respectively, and the other end having a wide area. The plane shape of the drain electrodes 175a and 175b may vary.

The first gate electrode 124a, the first source electrode 173a, and the first drain electrode 175a form a first thin film transistor (TFT) along with the first semiconductor 154a. The channel of the first thin film transistor is formed in the first semiconductor 154a between the first source electrode 173a and the first drain electrode 175a. The second gate electrode 124b, the second source electrode 173b, and the second drain electrode 175b form a second thin film transistor (TFT) along with the second semiconductor 154b. The channel of the first thin film transistor is formed in the second semiconductor 154b between the second source electrode 173b and the second drain electrode 175b.

A passivation layer 180 is formed on the source electrodes 173a and 173b, the drain electrodes 175a and 175b, and the exposed semiconductors 154a and 154b.

A color filter 230 is formed on the passivation layer 180, and the passivation layer 180 and the color filter 230 have openings 235a and 235b exposing the drain electrodes 175a and 175b. The color filter 230 may be elongated in the longitudinal direction along the data lines 171a and 171b to form a stripe.

A cover 30 made of silicon nitride to prevent an upper layer from being contaminated by gas generated from the color filters 230 is formed on the color filters 230.

The cover 30 has the contact holes 185a and 185b exposing the first and second drain electrodes 175a and 175b, and the dummy hole(s) 35 exposing the color filter 230.

The dummy hole(s) 35 exposes the color filters 230 thereby having a function as a gas emission portion emitting the gas generated from the color filters 230.

Accordingly, the dummy hole(s) 35 exposing the color filters 230 is formed to allow the gas of the color filters 230 to be sufficiently emitted so that the liquid crystal may be completely filled.

The dummy hole(s) 35 is not formed for all pixels of red, blue, and green, but is formed for two pixels or one pixel, thereby limiting the total area of the dummy hole(s) 35.

The shape of the dummy hole(s) 35 may vary. For example, the shape of the dummy hole(s) may be a circle or a quadrangle, and the size of one dummy hole 35 may be in the range of, for example, about 10 $\mu m^2$-about 200 $\mu m^2$.

This configuration is to minimize the slight change of the color coordinates due to the color filter(s) 230 exposed from the dummy hole(s) 35.

A pixel electrode 191 is formed on the cover 30. The pixel electrode 191 may be made of a transparent conductive material such as ITO or IZO, or a reflective metal such as aluminum, silver, chromium, or alloys thereof.

The pixel electrode 191 includes a first subpixel electrode 191a and a second subpixel electrode 191b that is larger than the first subpixel electrode 191a.

The first subpixel electrode 191a has a band shape of an approximate sideways "V" (<), and is enclosed by the second subpixel electrode 191b via a gap 93 interposed between the first and second subpixel electrodes 191a, 191b. The second subpixel electrode 191b has a plurality of cutouts 91 with a straight band shape, and the cutouts 91 form an angle of about 45 degrees with the gate lines 121 and the data lines 171a and 171b. The gap 93 includes a plurality of oblique portions substantially parallel to the cutouts 91, and a plurality of longitudinal portions substantially parallel to the data lines 171a and 171b. The cutouts 91 and gap 93 are alternately arranged with a cutout 71 of a common electrode 270.

The first/second subpixel electrodes 191a/191b are connected to the first/second drain electrodes 175a/175b of the first/second thin film transistors through the contact holes 185a/185b. In FIG. 10, the first subpixel electrode 191a disposed in the left pixel is connected to the first drain electrode 175a disposed on the left side, and the first subpixel electrode 191a disposed in the neighboring right pixel is connected to the second drain electrode 175b disposed on the right side.

The first/second subpixel electrodes 191a/191b receive data voltages from the first/second drain electrodes 175a/175b. The first/second subpixel electrodes 191a/191b applied with the data voltages generate an electric field along with the common electrode 270 of the common electrode panel 200 such that the orientation of the liquid crystal molecules of the liquid crystal layer 3 between the electrodes 191a/191b and 270 is determined.

The first and second subpixel electrodes 191a and 191b and the common electrode 270 form the first and second liquid crystal capacitors, thereby maintaining the applied voltage after the thin film transistors are turned off. The first and second subpixel electrodes 191a and 191b and the storage electrode line 131 form a storage capacitor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a substrate;
a gate line formed on the substrate;
a data line intersecting the gate line and including a source electrode;
a drain electrode facing the source electrode;
a passivation layer formed on the data line and the drain electrode;
a color filter formed on the passivation layer;
a cover formed on the color filter and having a contact hole exposing the drain electrode; and
a pixel electrode formed on the cover and connected to the drain electrode through the contact hole,
wherein the cover includes a dummy hole exposing the color filter.

2. The liquid crystal display of claim 1, wherein
the color filter includes red, green, and blue color filters, and
the dummy hole exposes the red, green, and blue color filters.

3. The liquid crystal display of claim 1, wherein
the color filter includes red, green, and blue color filters, and
a plurality of dummy holes exposes the red, green, and blue color filters.

4. The liquid crystal display of claim 2, wherein
the area of the dummy hole is in the range of about 10 $\mu m^2$-about 500 $\mu m^2$.

5. The liquid crystal display of claim 4, wherein
the dummy hole is covered by the pixel electrode.

6. The liquid crystal display of claim 5, wherein
the passivation layer and the color filter further include an opening exposing the drain electrode, and
the contact hole is formed in the opening.

7. The liquid crystal display of claim 1, wherein
the color filter includes red, green, and blue color filters, and
the dummy hole exposes a maximum of two color filters of the red, green, and blue color filters.

8. The liquid crystal display of claim 7, wherein
the area of the dummy hole is in the range of about 10 $\mu m^2$-about 200 $\mu m^2$.

9. The liquid crystal display of claim 8, wherein
the passivation layer and the color filter further include an opening exposing the drain electrode, and
the contact hole is formed in the opening.

10. The liquid crystal display of claim 1, wherein
the color filter includes red, green, and blue color filters, and
a plurality of dummy holes exposes a maximum of two color filters of the red, green, and blue color filters.

11. The liquid crystal display of claim 1, wherein
the color filter includes red, green, and blue color filters, and
the dummy hole exposes only one color filter of the red, green, and blue color filters.

12. The liquid crystal display of claim 11, wherein
the area of the dummy hole is in the range of about 10 $\mu m^2$-about 200 $\mu m^2$.

13. The liquid crystal display of claim 12, wherein
the passivation layer and the color filter have an opening exposing the drain electrode, and
the contact hole is formed in the opening.

14. The liquid crystal display of claim 1, wherein the cover is made of silicon nitride.

15. A liquid crystal display comprising:
a substrate;
a gate line formed on the substrate;
a data line intersecting the gate line;
a passivation layer formed on the data line;
a color filter formed on the passivation layer;
a cover formed on the color filter; and
a pixel electrode formed on the cover,
wherein the cover includes a dummy hole formed over a portion of the gate line and exposing the color filter.

16. The liquid crystal display of claim 15, wherein
the area of the dummy hole is in the range of about 10 $\mu m^2$-about 500 $\mu m^2$.

17. The liquid crystal display of claim 15, wherein
the dummy hole is covered by the pixel electrode.

18. The liquid crystal display of claim 15, wherein the cover is made of silicon nitride.

* * * * *